United States Patent
Park et al.

(10) Patent No.: US 12,480,058 B2
(45) Date of Patent: Nov. 25, 2025

(54) METHOD FOR LIGHTENING HEAVY OIL BY USING COKE PRODUCTION BYPRODUCT

(71) Applicants: KOREA RESEARCH INSTITUTE OF CHEMICAL TECHNOLOGY, Daejeon (KR); RESEARCH INSTITUTE OF INDUSTRIAL SCIENCE & TECHNOLOGY, Pohang-si (KR)

(72) Inventors: Sunyoung Park, Daejeon (KR); Chi Woong Ahn, Daejeon (KR); Gyoo Tae Kim, Daejeon (KR); Ki Hyuk Kang, Daejeon (KR); Hwi Min Seo, Daejeon (KR); Narae Kang, Daejeon (KR); Pill Won Seo, Daejeon (KR); Joon Woo Kim, Gwangyang-si (KR); Dong Jun Koh, Pohang-si (KR)

(73) Assignees: KOREA RESEARCH INSTITUTE OF CHEMICAL TECHNOLOGY, Daejeon (KR); RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 142 days.

(21) Appl. No.: 17/999,689

(22) PCT Filed: Apr. 27, 2021

(86) PCT No.: PCT/KR2021/005313
§ 371 (c)(1),
(2) Date: Nov. 22, 2022

(87) PCT Pub. No.: WO2021/241897
PCT Pub. Date: Dec. 2, 2021

(65) Prior Publication Data
US 2023/0203388 A1    Jun. 29, 2023

(30) Foreign Application Priority Data
May 28, 2020   (KR) .................. 10-2020-0064134

(51) Int. Cl.
*C10G 67/04* (2006.01)
*C10G 47/32* (2006.01)
*C10G 69/06* (2006.01)

(52) U.S. Cl.
CPC .......... *C10G 67/049* (2013.01); *C10G 47/32* (2013.01); *C10G 69/06* (2013.01); *C10G 2300/10* (2013.01); *C10G 2300/301* (2013.01); *C10G 2300/4006* (2013.01); *C10G 2300/4012* (2013.01)

(58) Field of Classification Search
CPC ........................ C10G 67/049; C10G 69/06; C10G 47/32–34; C10G 49/18–20; C10B 53/04; C10B 53/08
See application file for complete search history.

(56) References Cited

U.S. PATENT DOCUMENTS

| | | | | |
|---|---|---|---|---|
| 4,090,947 | A * | 5/1978 | Satchell, Jr. | C10G 47/34 208/53 |
| 5,462,650 | A | 10/1995 | Takito et al. | |
| 2011/0017635 | A1* | 1/2011 | Chabot | C10G 47/02 208/112 |
| 2015/0141717 | A1* | 5/2015 | Frey | C10G 1/002 585/315 |
| 2018/0291288 | A1* | 10/2018 | Brown | C10G 7/08 |

FOREIGN PATENT DOCUMENTS

| | | | | |
|---|---|---|---|---|
| CN | 110564437 | * | 12/2019 | ............. C10G 53/04 |
| JP | 2014077079 | A | 5/2014 | |
| KR | 100877004 | B1 | 12/2008 | |
| KR | 20090116377 | A | 11/2009 | |
| KR | 20110058639 | A | 6/2011 | |

OTHER PUBLICATIONS

English machine translation of CN 110564437A, obtained from Google. (Year: 2019).*
ISA Korean Intellectual Property Office, International Search Report Issued in Application No. PCT/KR2021/005313, Jul. 30, 2021, WIPO, 4 pages.

* cited by examiner

*Primary Examiner* — Renee Robinson
(74) *Attorney, Agent, or Firm* — McCoy Russell LLP

(57) ABSTRACT

A method for upgrading heavy oil by using a coke production byproduct comprises the steps of: producing a mixed solution by mixing a coke production byproduct and heavy oil; and hydrogenating the mixed solution under a hydrogenation catalyst, wherein the present disclosure is economical and effective by being able to reduce the amount of coke formation and significantly reduce the partial pressure of added hydrogen by using the coke production byproduct as a hydrogen donor.

6 Claims, No Drawings

METHOD FOR LIGHTENING HEAVY OIL BY USING COKE PRODUCTION BYPRODUCT

CROSS REFERENCE TO RELATED APPLICATIONS

The present application is a U.S. National Phase of International Application No. PCT/KR2021/005313 entitled "METHOD FOR LIGHTENING HEAVY OIL BY USING COKE PRODUCTION BYPRODUCT," and filed on Apr. 27, 2021. International Application No. PCT/KR2021/005313 claims priority to Korean Patent Application No. 10-2020-0064134 filed on May 28, 2020. The entire contents of each of the above-listed applications are hereby incorporated by reference for all purposes.

TECHNICAL FIELD

The present disclosure relates to a method for upgrading a heavy oil using a by-product from coke production, and more particularly, to a method for converting a low-grade heavy oil into a high value-added hydrocarbon oil while reducing coke occurrence.

BACKGROUND AND SUMMARY

Recently, while a demand for a light oil such as transport fuel continues to increase, a ratio of a heavy oil in crude oil produced is increasing compared to the past. Therefore, the need for development of a technology to produce a higher value-added hydrocarbon oil by upgrading a heavy oil produced in a crude oil refining process continues to arise.

A representative example of the heavy oil may include vacuum residue, and a low-grade heavy oil such as the vacuum residue has a characteristic of high contents of nickel, vanadium, sulfur, a nitrogen compound, and residual carbon (Conradson carbon residue), and thus, there is a limitation in that it is difficult to upgrade the oil.

A method for upgrading a heavy oil may largely include a thermal cracking process, a fluid catalytic cracking process, and a hydrocracking process. A thermal cracking process has an advantage of treating a low-grade heavy oil having high contents of residual carbon, metal, sulfur, and a nitrogen compound as compared with other processes using a catalyst, but there is no method for controlling production of a large amount of coke. In addition, since an amount of coke produced in the thermal cracking process is proportional to the heaviness of a feed used, an oil which may be economically treated is limited, considering the yield of a light oil.

Though a fluid catalytic cracking process is currently used a lot, it uses a zeolite-based catalyst, and the oil to be treated is more limited than those in other processes. In addition, a hydrocracking process may obtain a high conversion as compared with other processes, but is limited in that harsh operation conditions such as high temperature and pressure are involved. Since a hydrodesulfurization process also increases an amount of coke produced due to the heaviness of the treated oil, and thus, causes deactivation of a catalyst and process line/valve fouling, usable oil is limited.

Due to the limitations such as a shorter life due to catalyst deactivation by coke formation of the processes of treating heavy oil, problems with controlling process conditions, and a lower yield of a light product, a technology to suppress formation of coke and effectively treat a heavy oil is needed.

Accordingly, the need for development of a hydrogen donor which allows effective operation in a lower hydrogen partial pressure than that of the conventional technology in a process of upgrading a heavy oil or may derive a decrease in coke formation in a thermal cracking process arises.

A technology using a hydrogen donor is disclosed in Korean Patent Registration No. 10-1568615, but since an expensive supercritical or subcritical tetralin solvent is used as a hydrogen donor, it is limited in terms of economic feasibility, and an additional separation and refining process at a rear end for recovering a hydrogen donor should be involved. Further, since the content of a hydrogen donor material of 10 to 400 parts by weight with respect to 100 parts by weight of an oil to be treated has been suggested, a capacity to be treated in a reactor is increased, and thus, there is a limitation in that a reactor size should be increased.

Therefore, the need for a hydrogen donor, which allows economic feasibility to be secured, does not cause change in product properties to dispense with an additional separation process, and does not burden a reactor processing capacity with the use in a small amount, is raised.

RELATED ART DOCUMENTS

Korean Patent Laid-Open Publication No. 10-1568615 (Nov. 5, 2015)

DETAILED DESCRIPTION

Technical Problem

Thus, the present inventors contrived the present disclosure relating to a method for efficiently upgrading a low-grade heavy oil, using a by-product produced in a coke production process, based on the idea that when a low-priced material with low utility such as a process by-product is used as a hydrogen donor, economic feasibility may be secured and an additional separation process is not needed.

An object of the present disclosure is to provide a method for upgrading a heavy oil having no burden of a reactor processing capacity, by using a small amount of a by-product produced in a coke production process.

Another object of the present disclosure is to provide a method for upgrading a heavy oil, which allows a reaction process under low hydrogen partial pressure conditions and has a significantly good coke reduction effect, by using a by-product produced in a coke production process as a hydrogen donor.

Technical Solution

In one general aspect, a method for upgrading a heavy oil using a by-product from coke production, includes: mixing a heavy oil with a by-product from coke production to prepare a mixed solution; and hydrogenating the mixed solution under a hydrogenation catalyst.

In an exemplary embodiment of the present disclosure, the hydrogenating may be selected from the group consisting of a hydrocracking reaction, a hydrodesulfurization reaction, and a hydrodenitrogenation reaction.

In an exemplary embodiment of the present disclosure, the hydrogenating may be performed under conditions of 300 to 450° C. and atmospheric pressure to 200 bar.

In an exemplary embodiment of the present disclosure, the hydrogenation catalyst may include Mo, W, V, Cr, Co, Fe, Ni, Ru, C, or a combination thereof.

In an exemplary embodiment of the present disclosure, the by-product from coke production is produced in a coke production process including crushing and drying coal to prepare coking coal; and dry distilling the coking coal at 800 to 1300° C. to produce lump coke, in which a liquid by-product produced in the producing of lump coke is distilled at 130 to 600° C. under atmospheric pressure conditions or 30 to 400° C. under vacuum conditions of 0.5 bar.

In an exemplary embodiment of the present disclosure, the heavy oil may be any one or two or more selected from the group consisting of oil sands, bitumen, heavy oil, ultra-heavy oil, vacuum residue, atmospheric pressure residue, pyrolyzed fuel oil (PFO), fluid catalytic cracking decant oil (FCC-DO), and ethylene bottle oil (EBO).

In an exemplary embodiment of the present disclosure, the by-product from coke production may be included at 0.1 to 20 parts by weight based on 100 parts by weight of the heavy oil.

In an exemplary embodiment of the present disclosure, the heavy oil may have a content of hydrocarbon oil having a boiling point of 500° C. or higher of 30% or more.

In an exemplary embodiment of the present disclosure, a pretreatment step of solvent deasphalting (SDA) may be further included, before mixing the heavy oil with the by-product from coke production.

Advantageous Effects

The present disclosure, which relates to a method for converting a heavy oil into a light oil which is a high value-added hydrocarbon oil, provides a by-product from coke production as a hydrogen donor in a hydrogenation reaction of the heavy oil to reduce an amount of coke produced, and has better coke removal performance than a conventionally used hydrogen donor.

The by-product from coke production according to the present disclosure has increased hydrogen transfer capacity as compared with a conventionally used hydrogen donor, so that hydroprocessing may be efficiently performed even under low hydrogen partial pressure conditions. A conventional general hydrocracking or hydrodesulfurization reaction is achieved at a high hydrogen partial pressure of at least 80 bar or more, but the present disclosure provides a process in which a hydrogenation reaction is effectively performed even under a hydrogen partial pressure of less than 80 bar, thereby preventing an increase in production costs due to overly harsh conditions and deactivation of a hydrogenation catalyst.

BEST MODE

Hereinafter, a method for upgrading a heavy oil using a by-product from coke production according to the present disclosure will be described in detail.

Terms used in the present specification should be interpreted as having the meaning commonly understood by a person skilled in the art, unless otherwise defined. Drawings and examples of the present specification are for a person with ordinary skill in the art to easily understand and carry out the present disclosure, descriptions which may obscure the gist of the present disclosure may be omitted in the drawings and the examples, and the present disclosure is not limited by the drawings and the examples.

In addition, unless otherwise defined, all technical terms and scientific terms have the same meanings as those commonly understood by one of those with ordinary knowledge in the art to which the present disclosure pertains. The terms used herein are only for effectively describing a certain exemplary embodiment, and not intended to limit the present disclosure.

Hereinafter, when any one constituent element "comprises" another constituent element, it is not interpreted in a limited manner as consisting of only the constituent element, unless otherwise particularly stated, and it should be understood that other constituent elements may be further included.

Hereinafter, in the present specification, a "conversion" refers to a ratio of a total amount of a liquid product and a gas product based on a total product weight, when a hydrogenation reaction of a heavy oil is performed. Herein, the total product refers to a total weight of a gas product, a liquid product, a residue, and coke.

In the present specification, a "liquid yield" refers to a ratio of a total amount of a liquid product based on a total product weight, when a hydrogenation reaction of a heavy oil is performed. Here, the liquid product may be, for example, naphtha, a medium oil, and a gas oil.

In the present specification, "coke" refers to a main by-product of a hydrogenation reaction, which is formed of hydrocarbons and is not decomposed to a light oil any more. Coke is a by-product which, when produced, lowers a liquid yield of a hydrogenation reaction, and is deposited on the wall of a reactor, a transport pipe, and the like to cause a serious operational problem during a unit process.

The present disclosure provides a method for upgrading a heavy oil using a by-product from coke production, including: mixing a heavy oil with a by-product from coke production to prepare a mixed solution; and hydrogenating the mixed solution under a hydrogenation catalyst.

The heavy oil in the present disclosure may refer to any one or two or more selected from the group consisting of oil sands, bitumen, heavy oil, ultra-heavy oil, vacuum residue, atmospheric residue, pyrolyzed fuel oil (PFO), fluid catalytic cracking decant oil (FCC-DO), and ethylene bottle oil (EBO), but may be used without limitation as long as it is a petroleum-based residue.

The heavy oil may have a content of hydrocarbon oil having a boiling point of 500° C. or higher of 30% or more. Besides, the heavy oil contains a large amount of impurities such as microcarbon residue (MCR), metal, nitrogen, sulfur, and asphaltene, and upgrading of the heavy oil means that the heavy oil is modified into a high value-added hydrocarbon having a low boiling point. The method for upgrading a heavy oil is a hydrogenation reaction, and may include any process carried out in the presence of hydrogen, which includes methanation, an aqueous gas transition reaction, hydrogenation, hydrotreating, hydrodesulfurization, hydrodenitrogenation, hydrodeoxygenation, hydrodecarboxylation, hydrodecarbonylation, hydrodemetallation, hydrodearomatization, hydroisomerization, hydrodewaxing, and hydrocracking, but is not limited thereto.

As a preferred exemplary embodiment of the present disclosure, the hydrogenation may be selected from the group consisting of a hydrocracking reaction, a hydrodesulfurization reaction, and a hydrodenitrogenation reaction. The hydrogenation reaction refers to a reaction in which a carbon-carbon or carbon-heteroatom single bond is cut or decomposed by hydrogenation in the presence of a hydrogenation catalyst, and hydrogenation for bond cleavage is promoted by the catalyst. Impurities such as sulfur, nitrogen, and heavy metals may be removed from the heavy oil and the yield of a high value-added product having a low boiling point of 30 to 380° C. may be maximized.

Specifically, when a hydrogenation catalyst precursor is added, the hydrogenation catalyst precursor acts as a hydrogenation catalyst of the hydrogenation reaction in the form of being combined with impurities such as sulfur in the heavy oil, so that both a desulfurization effect and an effect of a yield increase of the hydrogenation reaction are shown.

The hydrogenation reaction may be performed under the conditions of 300 to 450° C., an initial hydrogen partial pressure of atmospheric pressure to 200 bar, and a reaction time of 0.5 to 12 hours. Specifically, the hydrogenation reaction may be performed under the conditions of 350 to 420° C., a hydrogen partial pressure of 30 to 70 bar, and a reaction time of 1 to 4 hours. The method for upgrading of a heavy oil according to the present disclosure may perform the reaction under the hydrogen partial pressure conditions lower than that of the conventional technology, as described above.

In an exemplary embodiment of the present disclosure, the hydrogenation reaction may be performed by a hydrocracking reaction, a hydrodesulfurization reaction, or a hydrodenitrogenation reaction, and in this case, a hydrogenation catalyst may be brought into contact with the mixed solution or a hydrogenation catalyst precursor may be included. Specifically, in the hydrocracking reaction, the hydrodesulfurization reaction, or the hydrodenitrogenation reaction, a mixed solution prepared by mixing a heavy oil and a by-product from coke production may be brought into contact with a hydrogenation catalyst, or the hydrogenation catalyst precursor may be added to the mixed solution and hydrocracking is performed under hydrogen partial pressure conditions of 30 to 70 bar at 350 to 420° C. in a reactor.

The hydrogenation catalyst or the hydrogenation catalyst precursor is a single metallic substance or two or more metallic substances, including molybdenum (Mo), tungsten (W), vanadium (V), chromium (Cr), cobalt (Co), iron (Fe), nickel (Ni), rubidium (Ru), palladium (Pd), carbon (C), or a combination thereof, and may be used in the form of a supported catalyst or a dispersed catalyst.

The supported catalyst may be in the form of any one or two or more metals selected from the group consisting of molybdenum (Mo), tungsten (W), vanadium (V), chromium (Cr), cobalt (Co), iron (Fe), nickel (Ni), rubidium (Ru), and palladium (Pd) supported on a carrier which is a porous support. Here, the carrier may be a metal oxide or carbon, and a specific example of the metal oxide includes alumina ($Al_2O_3$), silica ($SiO_2$), silica-alumina, titania ($TiO_2$), ceria (cerium oxide, $CeO_2$), zirconia (zirconium oxide, $ZrO_2$), tungstate zirconia (W—$ZrO_2$), and the like, and though it is not necessarily limited thereto, it is preferred that the carrier is selected from the group consisting of alumina ($Al_2O_3$), silica ($SiO_2$), and silica-alumina, for suppressing coke formation in the hydroprocessing process, allowing long-term operation, and obtaining a stable product.

The carrier may have a single pore structure such as macropores and micropores or a bimodal pore structure in which the single pore structures are appropriately mixed. However, for continuous activity, a bimodal pores structure including both macropores and micropores is preferred.

In this case, the pores of the carrier may have a size of, specifically 0.1 to 50 nm, and more specifically 1 to 20 nm to prevent blockage of pore opening by the fixation of the metal components to delay catalyst inactivation. In addition, the specific surface area may be 50 to 500 $m^2/g$, or specifically may be as large as 100 to 300 $m^2/g$ to increase catalytic activity.

The metal components in the carrier may be included at 3 to 25 wt %, specifically 5 to 20 wt % based on the total weight of the catalyst, thereby maintaining high catalytic activity and being present in the form of metal components dispersed well in the carrier.

The supported catalyst may be introduced to the reactor in a manner of filling or flowing. According to a preferred exemplary embodiment of the present disclosure, the supported catalyst may be used in the form in which a reactor for the hydrogenation reaction is filled with the supported catalyst to form a fixed layer.

Here, in order to minimize catalyst deactivation, the supported catalyst may be used in the form of multiple catalyst layers in which catalysts having different properties are separated and filled into each layer. Specifically, for example, when the catalysts are separated into three catalyst layers, the metal components used in each catalyst layer is similar to each other, but may be different in the activity of hydrocracking such as a desulfurization reaction, a demetallation reaction, and a denitrogenation reaction, by the difference in the nature of the carrier.

When the supported catalyst is in the form of forming a fixed layer, a liquid hourly space velocity in a reactor of the heavy oil may be 0.05 to 2.0 $h^{-1}$, specifically 0.1 to 0.8 $h^{-1}$.

The dispersed catalyst may be a heterogeneous catalyst or a homogeneous catalyst, and specifically may be a molybdenum-based catalyst or a tungsten-based catalyst as the homogeneous catalyst since it shows excellent catalytic activity and effectively derives heavy oil decomposition. When the dispersed catalyst or the dispersed catalyst precursor is two or more metallic substances, it may further include a surfactant for improving dispersion of metal. Since any surfactants known in the art may be used without limitation, detailed description thereof will be omitted.

In addition, in an exemplary embodiment of the present disclosure, a dispersed catalyst or a dispersed catalyst precursor which may be used as a hydrogenation catalyst is not limited to the "dispersed" catalyst depending on the properties of the catalyst, and may include both forms of colloidal or non-colloidal particles.

The dispersed catalyst precursor is generally an organic metal compound, and for example, may be a naphthenate of Mo, W, V, Cr, Co, Fe, Ni, and Ru, an octoate of Mo, a carbonyl compound of these metals, or the like.

Specifically, Mo-octoate which is a molybdenum organic material reacts with a small amount of sulfur included in the heavy oil to form a molybdenum disulfide ($MoS_2$) catalyst, and simultaneously, $MoS_2$ may be used as a catalyst of the hydrogenation reaction, and thus, may achieve both a catalytic effect and a desulfurization effect. Therefore, in this case, the by-product from coke production is used as a hydrogen donor, thereby significantly increasing hydroprocessing efficiency, in addition to the coke reduction effect to be achieved.

According to an exemplary embodiment of the present disclosure, the dispersed catalyst or the dispersed catalyst precursor may be added at a concentration of 10 to 100,000 ppm, specifically 100 to 10,000 ppm, and more specifically 200 to 2000 ppm with respect to the weight of the heavy oil. The present disclosure may achieve an effect of converting a heavy oil to a light oil having a low boiling point even with addition of a small amount of a catalyst in the range described above.

The reactor may be a batch reactor or a continuous reactor (flow reactor). As an exemplary embodiment of the present disclosure, the hydrocracking reaction may be performed in a batch reactor, which is preferred since it is easy to adjust the solvent solubility and miscibility of hydrogen, and the conversion and coke yield by the operation method are changed less. A specific embodiment may be as follows. Specific amounts of a heavy oil and a by-product from coke production are added to a batch autoclave, a molybdenum-based dispersed catalyst precursor is added thereto, the autoclave is filled with hydrogen gas up to 30 to 70 bar, and a reaction temperature is raised to 350 to 420° C. A stirring speed is set to 1000 to 2000 rpm. A time to reach to the reaction temperature is assumed as a reaction start time, the reaction time is set in a range of 1 hour to 4 hours, and the hydrocracking reaction is performed.

The by-product from coke production used in the present disclosure is produced from a coke production process in a steel industry and the like, and specifically, may be produced from a coke production process including crushing and drying coal to prepare coking coal; and dry distilling the coking coal at a high temperature of 800 to 1300° C. to produce lump coke. The dry distillation temperature of the coking coal may be adjusted depending on the process, but the dry distillation at 1000° C. or higher is preferred.

The by-product from coke production may be produced, more specifically, by distilling a liquid by-product produced in the step of producing the lump coke. Here, the distillation may be performed at 130 to 600° C. under atmospheric pressure conditions or in a temperature range of 30 to 400° C. under vacuum conditions of 0.5 bar, and specifically, at 150 to 570° C. under atmospheric pressure conditions or at 50 to 360° C. under vacuum conditions of 0.5 bar.

The by-product from coke production produced by distilling the liquid by-product may have an aromatic ratio in a range of 70 to 100%, specifically 80 to 90%. A saturate ratio may be 0 to 5%, specifically 0 to 1%. A resin ratio may be 5 to 20%, specifically 10 to 20%.

In addition, the by-product from coke production may have a ratio of a compound having a boiling point distribution of 200 to 400° C. of 70 to 100%, specifically 80 to 95%. A content of aromatic hydrogen in the by-product from coke production may be in a range of 65 to 95%, specifically 70 to 85%.

As a preferred exemplary embodiment of the present disclosure, the by-product from coke production may be included at 0.1 to 20 parts by weight based on 100 parts by weight of the heavy oil. It may be advantageous to include the by-product from coke production at 0.5 to 15 parts by weight, more specifically 1.0 to 13 parts by weight for efficiently achieving the coke reduction effect and increasing an upgrading conversion of a heavy oil.

In the method for hydroprocessing a heavy oil according to the present disclosure, a pretreatment step of solvent deasphalting may be further included, before mixing the heavy oil with the by-product from coke production. Since a large amount of an asphaltene component included in the heavy oil accumulates inside a reactor or a transport line due to agglomeration in the treatment process, the pretreatment step is included to prevent agglomeration of asphaltene.

Specifically, solvent deasphalting is to dissolve asphaltene and artificially precipitate it, using a hydrocarbon solvent. The hydrocarbon solvent may be a normal alkane-based hydrocarbon solvent or an aromatic hydrocarbon solvent. Specifically, the hydrocarbon solvent is a normal paraffin-based solvent, since it increases dispersibility in asphaltene heavy oil to have an excellent effect of preventing agglomeration of asphaltene.

Mode for Carrying Out the Disclosure

Hereinafter, the method for upgrading a heavy oil will be described in more detail by the following examples. However, the following examples are only a reference for describing the present disclosure in detail, and the present disclosure is not limited thereto and may be implemented in various forms.

Evaluation of Hydrocracking Reaction of Vacuum Residue

Example 1. Evaluation of Hydrocracking Reaction of Vacuum Residue Using by-Product from Coke Production as Hydrogen Donor 40 g of a vacuum residue (VR) obtained from Hyundai Oilbank Co. and 5 g of a by-product from coke production were added to a 250 ml batch reactor (Parr Instrument) to prepare a reactant. Thereafter, as a dispersed catalyst precursor, Mo octoate (Shepherd Chemical Co. Ltd.) at a concentration of 1000 ppm with respect to the weight of vacuum residue was added to the reactant. Filling and purging were repeated three times or more in the reactor, and then an initial hydrogen partial pressure was set to 40 bar at an initial temperature of 80° C. After a reaction temperature was raised to 410° C., a stirring speed was set to 1,500 rpm, and the hydrocracking reaction of the vacuum residue was carried out for 2 hours. When the reaction is completed, the reactant was rapidly cooled to a room temperature by a cooling coil, the gaseous product was captured in a tedlar bag and analyzed by gas chromatography equipped with TCD and FID, the liquid product and coke were separated in toluene depending on a solubility difference and quantified, and the characteristics and the results for the physical properties of the product are shown in the following Tables 2 and 3.

Comparative Example 1. Evaluation of Hydrocracking Reaction of Vacuum Residue

The hydrocracking reaction of vacuum residue was performed under the same reaction conditions as in Example 1, except that the by-product from coke production and the dispersed catalyst were not used. When the reaction is completed, the reactant was rapidly cooled to a room temperature by a cooling coil, the gaseous product was captured in a tedlar bag and analyzed by gas chromatography equipped with TCD and FID, the liquid product and coke were separated in toluene depending on a solubility difference and quantified, and the characteristics and the results for the physical properties of the product are shown in the following Tables 2 and 3.

Comparative Example 2. Evaluation of Hydrocracking Reaction of Vacuum Residue

The hydrocracking reaction of vacuum residue was performed under the same reaction conditions as in Example 1, except that the by-product from coke production was not used. When the reaction is completed, the reactant was rapidly cooled to a room temperature by a cooling coil, the gaseous product was captured in a tedlar bag and analyzed by gas chromatography equipped with TCD and FID, the liquid product and coke were separated in toluene depending on a solubility difference and quantified, and the characteristics and the results for the physical properties of the product are shown in the following Tables 2 and 3.

Comparative Example 3. Evaluation of Hydrocracking Reaction of Vacuum Residue

The hydrocracking reaction of vacuum residue was performed under the same reaction conditions as in Example 1, except that the dispersed catalyst was not used. When the reaction is completed, the reactant was rapidly cooled to a room temperature by a cooling coil, the gaseous product was captured in a tedlar bag and analyzed by gas chromatography equipped with TCD and FID, the liquid product and coke were separated in toluene depending on a solubility difference and quantified, and the characteristics and the results for the physical properties of the product are shown in the following Tables 2 and 3.

Comparative Example 4. Evaluation of Hydrocracking Reaction of Vacuum Residue

The hydrocracking reaction of vacuum residue was performed under the same reaction conditions as in Example 1, except that the initial hydrogen partial pressure was set to 80 bar and the dispersed catalyst was not used. When the reaction is completed, the reactant was rapidly cooled to a room temperature by a cooling coil, the gaseous product was captured in a tedlar bag and analyzed by gas chromatography equipped with TCD and FID, the liquid product and coke were separated in toluene depending on a solubility difference and quantified, and the characteristics and the results for the physical properties of the product are shown in the following Tables 2 and 3.

Comparative Example 5. Evaluation of Hydrocracking Reaction of Vacuum Residue

The hydrocracking reaction of vacuum residue was performed under the same reaction conditions as in Example 1, except that the initial hydrogen partial pressure was set to 80 bar and the by-product from coke production and the dispersed catalyst were not used. When the reaction is completed, the reactant was rapidly cooled to a room temperature by a cooling coil, the gaseous product was captured in a tedlar bag and analyzed by gas chromatography equipped with TCD and FID, the liquid product and coke were separated in toluene depending on a solubility difference and quantified, and the characteristics and the results for the physical properties of the product are shown in the following Tables 2 and 3.

Comparative Example 6. Evaluation of Hydrocracking Reaction of Vacuum Residue

The hydrocracking reaction of vacuum residue was performed under the same reaction conditions as in Example 1, except that tetralin was used instead of the by-product from coke production. When the reaction is completed, the reactant was rapidly cooled to a room temperature by a cooling coil, the gaseous product was captured in a tedlar bag and analyzed by gas chromatography equipped with TCD and FID, the liquid product and coke were separated in toluene depending on a solubility difference and quantified, and the characteristics and the results for the physical properties of the product are shown in the following Tables 2 and 3.

TABLE 1

Elemental analysis of vacuum residue used in experiment

| Classification | Component | content |
| --- | --- | --- |
| Elemental analysis | C | 83.7 wt % |
|  | H | 10.1 wt % |
|  | N | 0.6 wt % |
|  | S | 5.6 wt % |
| Component analysis of heavy metal | Ni | 72.3 wppm |
|  | V | 309.1 wppm |
| SARA analysis | Saturates | 5.0 wt % |
|  | Aromatics | 51.8 wt % |
|  | Resins | 24.8 wt % |
|  | Asphaltenes | 18.4 wt % |
|  | Total | 100 wt % |
| API |  | 5.8° |
| Distillation Curve | >524° C. | 78.5 wt % |
| Conradson carbon residue: CCR |  | 23.3 wt % |

TABLE 2

Conditions of hydrocracking reaction of Example 1 and Comparative Examples 1 to 6

| Classification | Vacuum residue (g) | Reaction temperature (° C.) | Initial hydrogen partial pressure (@80° C.) (bar) | Reaction time (hr) | Dispersed catalyst (ppm) | Hydrogen donor (g) |
| --- | --- | --- | --- | --- | --- | --- |
| Example 1 | 40 | 410 | 40 | 2 | 1,000 | 5 |
| Comparative Example 1 | 40 | 410 | 40 | 2 | — | — |
| Comparative Example 2 | 40 | 410 | 40 | 2 | 1,000 | — |
| Comparative Example 3 | 40 | 410 | 40 | 2 | — | 5 |
| Comparative Example 4 | 40 | 410 | 80 | 2 | — | 5 |
| Comparative Example 5 | 40 | 410 | 80 | 2 | — | — |
| Comparative Example 6 | 40 | 410 | 40 | 2 | 1,000 | 5 |

TABLE 3

Evaluation of hydrocracking reaction of vacuum residue depending on presence or absence of by-product from coke production

| Product distribution | Example 1 | Comparative Example 1 | Comparative Example 2 | Comparative Example 3 | Comparative Example 4 | Comparative Example 5 | Comparative Example 6 |
| --- | --- | --- | --- | --- | --- | --- | --- |
| Gas yield (wt %) | 4.76 | 8.79 | 6.49 | 5.88 | 5.54 | 6.41 | 6.32 |

TABLE 3-continued

Evaluation of hydrocracking reaction of vacuum residue depending on presence or absence of by-product from coke production

| Product distribution | Example 1 | Comparative Example 1 | Comparative Example 2 | Comparative Example 3 | Comparative Example 4 | Comparative Example 5 | Comparative Example 6 |
|---|---|---|---|---|---|---|---|
| Liquid yield (wt %) | 94.27 | 77.9 | 82.94 | 89.37 | 91.82 | 91.31 | 89.68 |
| Coke yield (wt %) | 0.97 | 13.28 | 10.57 | 4.75 | 2.64 | 2.28 | 4.00 |
| +524° C. conversion rate (wt %) | 72.74 | 75.54 | 78.32 | 70.18 | 67.75 | 58.94 | 78.52 |
| Asphaltene conversion rate (wt %) | 59.73 | 55.11 | 66.25 | 49.13 | 50.98 | 49.67 | 66.20 |
| Asphaltene + coke yield (wt %) | 8.38 | 21.54 | 16.78 | 14.11 | 11.66 | 11.54 | 10.22 |

As shown in Table 3, in Comparative Example 1 in which the hydrocracking reaction was performed without use of the by-product from coke production and the dispersed catalyst, the coke yield was 10.11 wt %, but in Comparative Example 3 in which the by-product from coke production was used, the coke yield was 4.75 wt %, and thus, it was confirmed that when the by-product from coke production was added to the hydrocracking reaction, an effect of reducing coke production without the dispersed catalyst was shown.

In Example 1 in which the by-product from coke production and the dispersed catalyst were used, the coke yield was 0.97 wt %, and thus, it was confirmed that the coke reduction effect was 10 times or more that of Comparative Example 1 in which both the by-product from coke production and the dispersed catalyst were not used. It was confirmed that the increased coke reduction effect as compared with Comparative Example 3 using no dispersed catalyst was exerted, and a high liquid yield was shown. In addition, as compared with Comparative Examples 4 and 5, in Example 1, from the results of the significantly low coke yield, it was confirmed that coke production was effectively suppressed even under the conditions of low hydrogen partial pressure.

Even as compared with Comparative Example 6 using tetralin as the hydrogen donor instead of the by-product from coke production according to the present disclosure, the results of a significantly low coke yield were shown in Example 1.

While the preferred exemplary embodiment of the present disclosure has been described above, the present disclosure is not limited thereto, and various modification may be carried out within the claims, the description of the disclosure, and the attached drawings, which also belongs to the scope of the present disclosure, of course.

The invention claimed is:

1. A method for upgrading a heavy oil using a by-product from coke production, the method comprising:
   a) mixing the heavy oil with the by-product from coke production to prepare a mixed solution in a batch reactor;
   b) after step a), adding a hydrogenation catalyst to the mixed solution;
   c) after step b), filling the reactor with hydrogen gas to set an initial hydrogen partial pressure to 30 to 70 bar at a first reaction temperature; and
   d) after step c), performing a hydrocracking reaction of the heavy oil under a stirring speed of 1000 to 2000 rpm and a second reaction temperature which is higher than the first reaction temperature;
   wherein the hydrogenation catalyst includes Mo-octoate,
   wherein the by-product from coke production is produced in a coke production process including:
      crushing and drying coal to prepare coking coal; and
      dry distilling the coking coal at 800 to 1300° C. to produce lump coke,
      in which a liquid by-product produced in the producing of lump coke is distilled at 130 to 600° C. under atmospheric pressure conditions or 30 to 400° C. under vacuum conditions of 0.5 bar to produce the by-product from coke production,
   wherein the by-product from coke production has an aromatic ratio in a range of 80 to 90% based on the total compounds contained in the by-product from coke production, and wherein the by-product from coke production has a ratio of a compound having a boiling point distribution of 200 to 400° C. of 80 to 95% based on the total compounds contained in the by-product from coke production; and
   wherein a content of aromatic hydrogen bonded to aromatic hydrocarbon is 65 to 95% based on the total functional group bonded to the aromatic hydrocarbon.

2. The method for upgrading a heavy oil of claim 1, wherein the second reaction temperature is 300 to 450° C.

3. The method for upgrading a heavy oil of claim 1, wherein the heavy oil is any one or two or more selected from the group consisting of: oil sands, bitumen, heavy oil, ultra-heavy oil, vacuum residue, atmospheric residue, pyrolyzed fuel oil (PFO), fluid catalytic cracking decant oil (FCC-DO), and ethylene bottle oil (EBO).

4. The method for upgrading a heavy oil of claim 1, wherein the by-product from coke production is included at 0.1 to 20 parts by weight based on 100 parts by weight of the heavy oil.

5. The method for upgrading a heavy oil of claim 1, wherein the heavy oil has a content of hydrocarbon oil having a boiling point of 500° C. or higher of 30% or more.

6. The method for upgrading a heavy oil of claim 1, further comprising: a pretreatment process of solvent deasphalting before the mixing of the heavy oil with the by-product from coke production.

* * * * *